United States Patent
Spencer et al.

(10) Patent No.: US 11,888,823 B2
(45) Date of Patent: Jan. 30, 2024

(54) SECURED IN-TUNNEL MESSAGES AND ACCESS CONTROL

(71) Applicant: BlackBerry Limited, Waterloo (CA)

(72) Inventors: Bradford Lawrence Spencer, Hammonds Plains (CA); Yu Tang, Waterloo (CA); Paul Franklin Medynski, Halifax (CA); Shiladitya Sircar, Ottawa (CA); Christopher Donald MacDonald, Kitchener (CA)

(73) Assignee: BlackBerry Limited, Waterloo (CA)

( * ) Notice: Subject to any disclaimer, the term of this patent is extended or adjusted under 35 U.S.C. 154(b) by 141 days.

(21) Appl. No.: 17/232,028

(22) Filed: Apr. 15, 2021

(65) Prior Publication Data

US 2022/0337549 A1 Oct. 20, 2022

(51) Int. Cl.
*H04L 9/40* (2022.01)
*H04L 67/55* (2022.01)
*H04L 12/46* (2006.01)

(52) U.S. Cl.
CPC ........ *H04L 63/029* (2013.01); *H04L 12/4633* (2013.01); *H04L 63/0236* (2013.01); *H04L 67/55* (2022.05)

(58) Field of Classification Search
CPC ............. H04L 12/4633; H04L 63/0236; H04L 63/029; H04L 67/55
See application file for complete search history.

(56) References Cited

U.S. PATENT DOCUMENTS

| | | | | |
|---|---|---|---|---|
| 9,332,049 | B1* | 5/2016 | Herrero | H04L 65/762 |
| 9,998,299 | B2* | 6/2018 | Herrero | H04L 69/165 |
| 10,855,491 | B2* | 12/2020 | Xue | H04L 12/4633 |
| 2004/0013118 | A1* | 1/2004 | Borella | H04L 12/4633 |
| | | | | 370/395.2 |
| 2004/0066769 | A1* | 4/2004 | Ahmavaara | H04L 63/029 |
| | | | | 370/338 |
| 2011/0075549 | A1* | 3/2011 | Lu | H04L 45/507 |
| | | | | 370/216 |
| 2013/0283037 | A1* | 10/2013 | Katz | H04L 65/762 |
| | | | | 713/150 |
| 2015/0149611 | A1* | 5/2015 | Lissack | G06F 9/45558 |
| | | | | 709/224 |

(Continued)

OTHER PUBLICATIONS

3GPP TR 33.830 V0.5.0 (Nov. 2013), 3rd Generation Partnership Project; Technical Specification Group Services and System Aspects; Study on Firewall Traversal; Stage 2, (Release 8), Nov. 2013, 66 pages.

(Continued)

*Primary Examiner* — George C Neurauter, Jr.
(74) *Attorney, Agent, or Firm* — Fish & Richardson P.C.

(57) ABSTRACT

Systems, methods, and software can be used for securing in-tunnel messages. One example of a method includes establishing a tunneling connection between a server and an endpoint. The method further includes receiving a packet from the server over the tunneling connection. The method yet further includes determining that the packet comprises a tunneling control message based on at least one address in the packet. Based on the determination of a received packet comprising a tunneling control message, the method can ensure the security of in-tunnel messages based on an indication in the tunneling control message.

19 Claims, 4 Drawing Sheets

(56) References Cited

U.S. PATENT DOCUMENTS

| | | | |
|---|---|---|---|
| 2016/0127149 A1* | 5/2016 | Xue | H04L 41/0803 |
| | | | 370/392 |
| 2016/0269285 A1* | 9/2016 | Herrero | H04L 45/74 |
| 2017/0048192 A1 | 2/2017 | Herrero | |
| 2017/0078359 A1* | 3/2017 | Herrero | H04N 21/4788 |
| 2018/0054388 A1* | 2/2018 | Herrero | H04L 47/122 |
| 2018/0115515 A1* | 4/2018 | Herrero | H04L 61/2592 |

OTHER PUBLICATIONS

Extended European Search Report in European Appln. No. 22161922.4, dated Sep. 9, 2022, 8 pages.

* cited by examiner

FIG. 4

US 11,888,823 B2

SECURED IN-TUNNEL MESSAGES AND ACCESS CONTROL

TECHNICAL FIELD

The present disclosure relates to a method for securing in-tunnel messages.

BACKGROUND

In some cases, a tunneling connection can be used for data transmission. A tunnel can be established between a server and an endpoint. The endpoint can transmit data packets over the tunnel to the server. The server can receive the data packets and forward the data packets to other destinations.

DESCRIPTION OF DRAWINGS

Like reference numbers and designations in the various drawings indicate like elements.

DETAILED DESCRIPTION

In some cases, the endpoint can use the endpoint software to manage the tunnel connection. The endpoint software can be an application, an extension, a component of the operating system, or any combination therefore. When the endpoint has data to transmit, the endpoint software can receive the data, e.g., from other applications or the operating system executing on the endpoint, and send the data packet through the tunnel. Similarly, the endpoint software can receive data from the tunnel and forward to the operating system and other applications executing on the endpoint. The server may use corresponding server software to perform the receiving and transmitting operation on the server.

In some cases, the endpoint software or the server software do not perform packet inspection functions. In other words, they would send and receive the packets to their destinations, without examining the contents of the packets. This makes it difficult to transmit tunneling control messages between the endpoint and the server. For example, an application on the endpoint may send a connection request to a third-party server on the Internet. The connection request is sent over the tunnel to the server. The server determines, based on the destination address of the packet that includes the connection request, that the connection request is to be sent to a third-party server. The server can further determine, e.g., based on a security policy, that the third-party server should not be accessed by the endpoint. As such, the server can block the packet that includes the connection request from being forward to the third-party server. However, the endpoint may not be aware of this blockage. Even if the server sends packets including a specific tunnel control message to indicate such a blockage, the endpoint software would not be able to determine that the packet includes such a specific tunnel control message because the endpoint software does not inspect the content of the packet. If the endpoint software forwards the packet to the application that generates the connection request, the application may not be able to understand the packet because the application may be agnostic of the tunnel connection and does not have any capability of interpreting any control messages related to the tunnel connection.

In another example, the server may be offline for a scheduled maintenance. It will be helpful if the server can send another tunneling control message indicating such an event, so that the endpoint can initiate another tunneling connection with another server, instead of just waiting until the tunnel times out when the server is offline.

In some cases, the endpoint's operating system provider may provide an operating system platform, which comprises a network infrastructure configured to inject a push notification delivered to the endpoint by the operating system platform. The server can send a push notification to an endpoint using the operating system platform. However, such a push notification operation is managed by the operating system platform and thus sometimes has long delays and is unreliable. The push notification is also not transmitted over the tunnel and thus may incur security and privacy risks.

The present disclosure provides a method of identifying tunneling control messages that are transmitted over the tunneling connection. For example, a method of securing in-tunnel messages includes determining address information in the tunnel control message of a packet. By determining the address information in the tunnel control message, a further indication can be provided, such as whether a connection request has been blocked, a status of the server, and whether additional ownership evidence is needed. The protocol selection techniques will be described in greater detail below, with reference to FIGS. 1 to 5.

Figure 1:
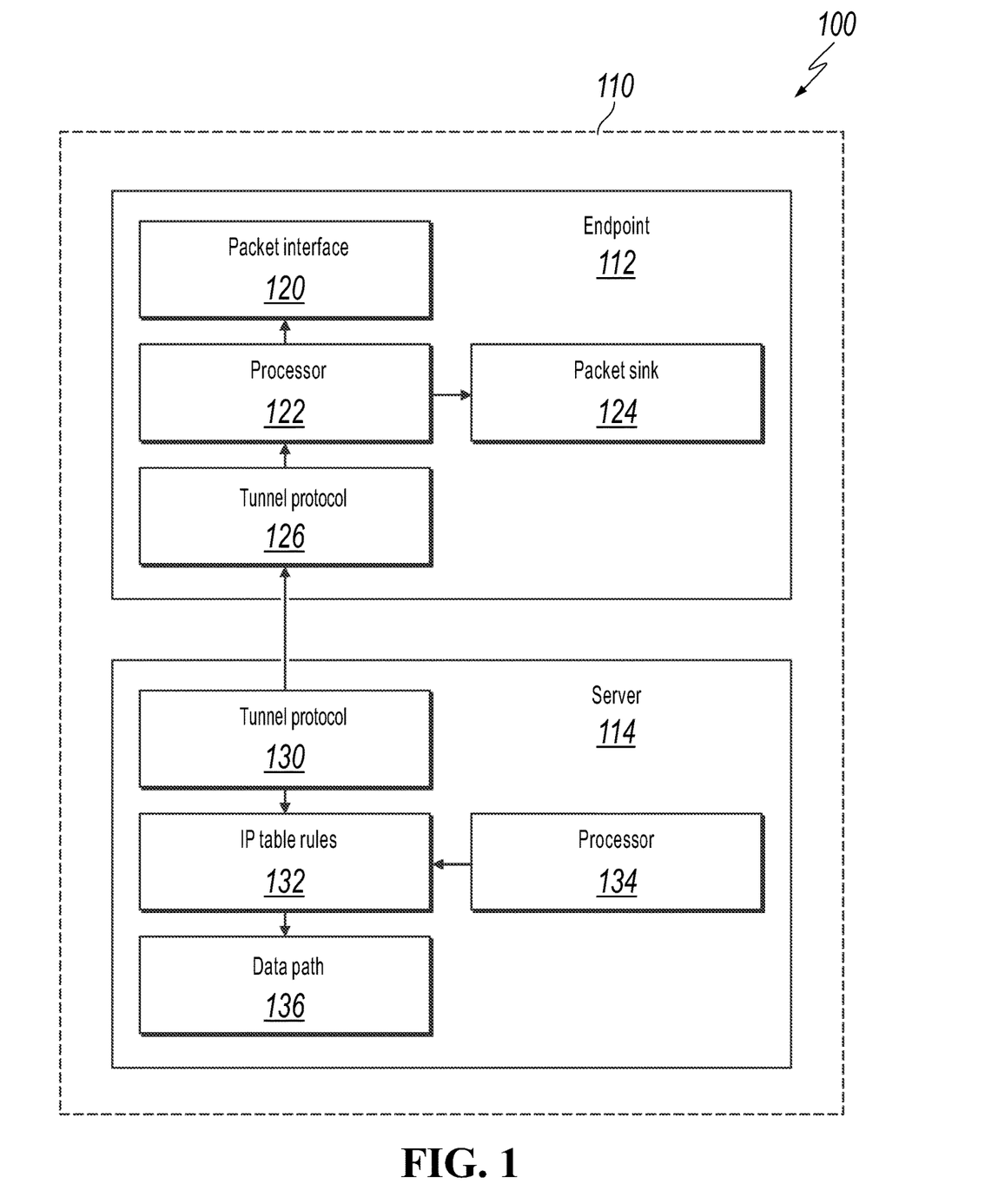
FIG. 1 is a diagram showing an example system for selecting a protocol to be used to establish a tunneling connection, according to an implementation.

FIG. 1 is an example system 100 for processing packets transmitted over a tunneling connection, according to an implementation. At a high level, the example system 100 includes one or more endpoints 112, a network, and one or more servers 114 communicating with the endpoint 112 and a third-party application/server over the network. The server 114 and the endpoint 112 are managed under the same operating environment 110 which can interact with a third-party environment. In one example, the endpoint 112 can be implemented to process packets including tunnel control message from the server 114 or from a third-party platform to ensure the security of data transmission. In one example, the server 114 can be implemented to process packets received from the endpoint 112 or from a third-party server to ensure that an indication related to the packets can be delivered efficiently.

In one example, the endpoint 112 comprises an agent configured to receive/send data. When the server 114 receives a request/data at a data path 136 from another server or from the endpoint 112. A processor 134 of the server 114 may utilize an internet protocol (IP) table rules 132 to determine whether this request/data should be accessed by the endpoint 112. For example, for each message, the processor 134 determines the request/data is sent by a predetermined process based on the tunneled packet and allows the message to be sent to the endpoint 112 using a tunnel protocol 130. The tunneled packet comprises IP and port information of a packet source and IP and port information of a packet destination. When IP and port information of a packet source and IP and port information of a packet destination meet predetermined rules, e.g., a traffic firewall or the IP table rules 132, the processor 134 of the server 114 determines that the request/data should be blocked or dropped. In response to this blockage, the server 114 prepares a tunnel control message for the endpoint 112 in a packet. In another example, the tunneled packet comprises signaling messages with injected IP or TCP header extensions for the server 114's determination. In yet another example, the tunneled packet can comprise a specific protocol number to embed in IP information for the server 114 to pick out signaling messages and simultaneously prevent fake ones. In one example, the endpoint 112 receives the packet including a tunnel control message at a processor 122 from the server 114 over the network established using a tunnel protocol 126. The processor 122 of the endpoint 112 identifies at least one address of the packet and determines an indication identified in the tunnel control message based on the address of the packet. The address of the packet comprises the IP and port information of a packet source and IP and port information of a packet destination of the tunneled packet. In some cases, the address of the packet can be configured as a specific address to indicate the endpoint 112 to read the packet, which comprises a number of fields to refer to different incidents. In some cases, the address of the packet can be configured to have a number of IP addresses, and each IP address can refer to an individual incident.

The endpoint 112 further performs, in response to the indication indicated in the tunnel control message, corresponding actions. In one case, when the indication in the tunnel control message indicates that the request to the server 114 has been blocked, the endpoint 112 generates a notification/message via a user interface to inform the user that the request has been blocked. In one case, when the indication in the tunnel control message indicates that the server 114 is offline for a maintenance, the endpoint 112 sends another request to another server to establish another tunneling connection. In one case, when the indication in the tunnel control message comprises an ownership request, the endpoint 112 sends an ownership response in response to the ownership request from the server 114. In some cases, the processor 122 of the endpoint 112 can perform a determination for packets based on address information of the packets and determines whether the packets should be blocked from sending to the server 114 based on the address information of the packets. In one case, if the address of the packet meets predetermined rules, the endpoint 112 moves the packet to a packet sink 124. Otherwise, the processor 122 sends the packet to a packet interface 120 for any further actions, such as to be sent to a third-party platform.

In some cases, the signaling works in both directions, e.g., from the server 114 to the endpoint 112 or from the endpoint 112 to the server 114. The endpoint 112 is able to send unsolicited messages to the server 114 on the cloud. In some cases, the agent at the endpoint 112 might report telemetry or request additional tunnel features via such unsolicited messages, and the server 114 on the cloud can respond with an appropriate pattern of messages.

For example, the server 114 sends the endpoint 112 IP networking traffic to the cloud where access control is applied before that traffic can further egress to certain controlled destinations, such as public or private network destinations, including Internet destinations. This tunneling connection could use many technologies, e.g., the tunnel protocol 130. Thus, the endpoint 112 has its own IP address on a "virtual network" that exists only between the server 114 and its endpoints. All traffic onto or off of this network passes through either an endpoint (e.g., the endpoint 112) or a cloud server (e.g., the server 114), which is how the cloud applies access control rules. The agent on the endpoint 112 carries traffic from other applications/programs running next to the agent on the endpoint 112 across the tunnel.

In one example, signaling is when the cloud's access control blocks a connection from the endpoint 112, the server 114 on the cloud signals the endpoint 112 to inform the agent that the connection has been blocked via a notification. In another example, the server 114 proactively notifies the endpoint 112 when a cloud server is going offline, which cloud server may be the server 114 or any other servers on the cloud, and the endpoint 112 should select another server for signaling.

The system 100 secures messages/notification via the tunnel's predetermined security context. Since the cloud controls all traffic entering the tunnel from its end, the cloud (e.g., the server 114 on the cloud) can ensure that all traffic with a specific to and from address originates only from the cloud itself which is not through some connected network like the Internet. Likewise, since the agent (e.g., the endpoint 112) controls all traffic on its end, the agent can ensure that all traffic with the opposite to and from addresses are from the agent itself and not some other source on the endpoint 112. Thus, signaling messages can be sent as user datagram protocol (UDP) packets between the endpoint 112 and the server 114 in plain text with no additional encryption or authentication, such that simplifying processing and reducing transmission cost and message size which can fit in a maximum transmission unit (MTU)-sized UDP packet.

For reliability, when signaling is done with packets, the system 100 may also apply a retry-until-acknowledgement protocol with short timeouts to ensure the reliability of data transmission.

In one example, for connections to certain destinations, the cloud's access control rules require recent "evidence of owner control" from the agent at the endpoint 112. For example, the evidence of owner control may be a time-stamped cryptographic evidence that the agent can only possess when the user performs certain interactions, thus demonstrating to the cloud that the user who is taking the actions has the owner control in the connections. The user may re-enter, e.g., his/her credentials with an Identity Provider (IDP) which provides a signed token that can then be verified by the cloud during access control. Alternatively, the evidence of owner control can be behavioral information gathered or generated by the agent itself or by another agent running in the system 100 on other endpoints. This behavioral information can be provided to the cloud (or another cloud running in the system 100) as an evidence that the authorized user is currently in control of the endpoint 112, thus permitting access control. Another example of evidence can be examining a pattern of the network traffic itself in the cloud for consistency with the user's behaviors. In addition, yet another example of evidence would be multiple types of evidence in combination.

Furthermore, the system 100 can also consider an administrator of the system 100 to specify which destinations require evidence, and what the nature of that evidence is to ensure the security of tunneling connection. The cloud checks connections against those rules and rejects the connection when evidence is required but not available from the agent at the endpoint 112.

Similarly, the agent can also provide evidence to the cloud proactively. For example, when identifying a predicted connection to be requested from the endpoint 112 under certain criteria are already met, the endpoint 112 can provide the evidence to be allowed to establish the connection before actually establishing the connection. Evidence can be required per-destination, per-connection-attempt, or just per time period, e.g., evidence timestamped from the endpoint 112 for this tunneling connection to be provided within a predetermined time frame. Without evidence already available, the connection fails. In this case, a request (e.g., a challenge or a handshake) can be sent or not which triggers on-demand evidence or proactive evidence. In another case, the connection can be held while the agent is challenged, and when sufficient evidence is provided within a predetermined time frame, the connection is released and allowed to continue, unless failed.

In one example, the cloud already sends "blocked" notifications via the established tunneling connection disclosed herein, the blocked notifications can also carry a challenge for destinations that require evidence, or a separate challenge can be sent over the tunneling connection. The challenge can contain a nonce to avoid replay attacks, or the cloud could rely on tamper-proof timestamps in the evidence.

The agent can provide evidence in many ways. In one example, specific markers or IP header extensions, for example, can be placed in response packets in response to the challenge. For example, via a signaling message, a representational state transfer (REST) application program interface (API) call, or some other network call, via an IP header extension or other special network traffic sent over the tunnel. Evidence can take many forms as discussed above. Furthermore, the agent can provide evidence proactively without a challenge, such as a timestamped evidence. Or in some cases, the evidence may be challenge-based evidence (with a nonce), the user can spontaneously ask for a challenge via in-tunnel signaling and fulfill the challenge separately from the context of a specific connection attempt.

By the packet processing techniques disclosed herein, the system 100 is able to transmit messages or push notifications in a secured manner.

Turning to a general description for elements disclosed in FIG. 1, an endpoint, e.g., the endpoints 112, may include, without limitation, any of the following: computing device, mobile electronic device, user device, mobile station, subscriber station, portable electronic device, mobile communications device, wireless modem, wireless terminal, server, web server, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Network includes any suitable networks operable to support communication between components of system 100. Network may include any type of wired or wireless communication channel capable of coupling together computing nodes. Network may include any interconnecting system capable of transmitting audio, video, electrical signals, optical signals, data, messages, or any combination of the preceding. Network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network may be configured to support any communication protocols as would be appreciated by one of ordinary skill in the art upon viewing this disclosure.

Servers 114 include any suitable storage scheme including any software, hardware, firmware, and/or combination thereof capable of storing and processing information. Example servers 114 include individual data storage devices (e.g., memory, disks, solid-state drives), which may be part of individual storage engines and/or may be separate entities coupled to storage engines. Servers 114 may store third-party databases, database management systems, a file system, and/or other entities that include or that manage data repositories.

Figure 2:
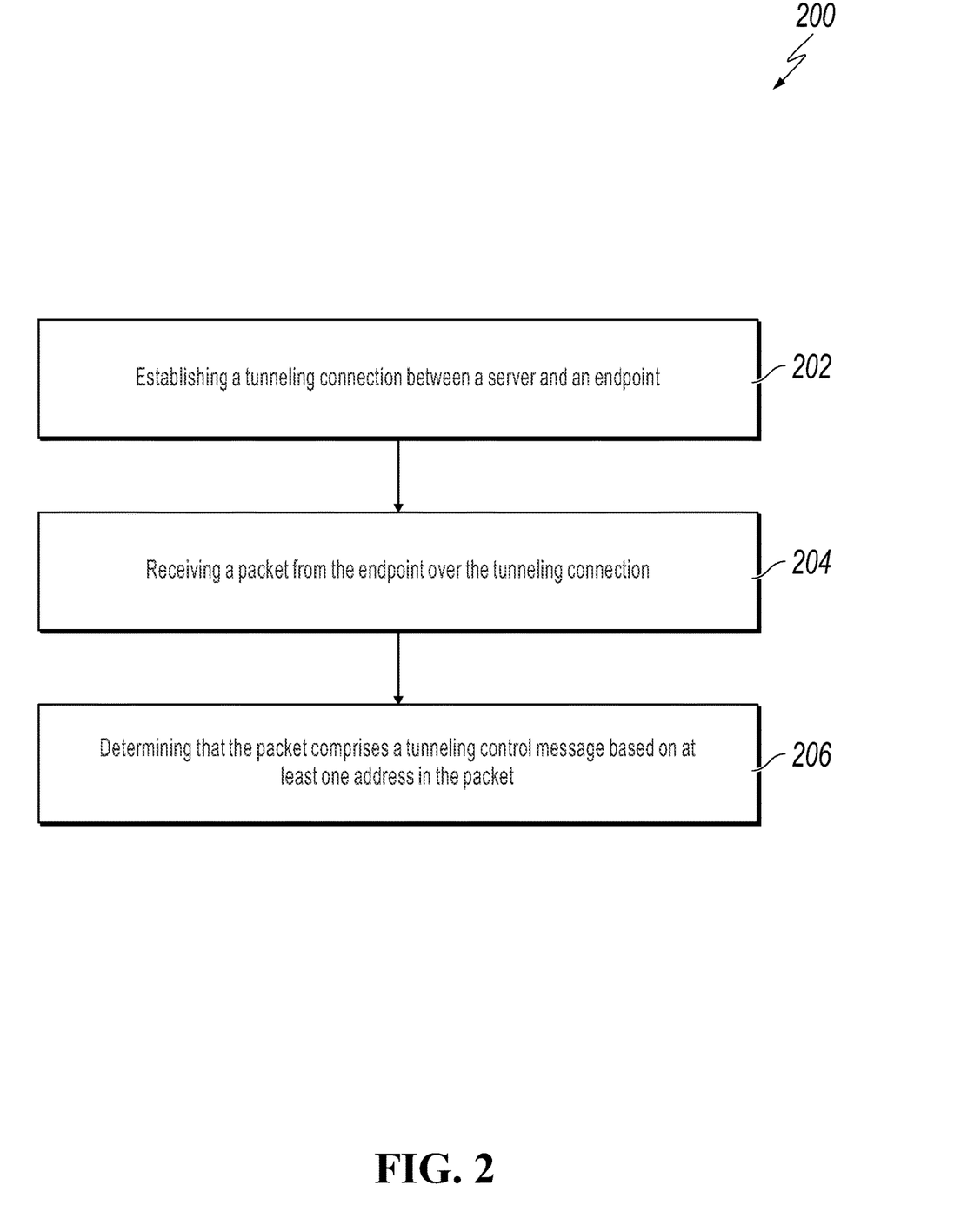
FIG. 2 is a flowchart showing an example method for selecting a protocol to be used to establish a tunneling connection, according to an implementation.

FIG. 2 is a flowchart showing an example method 200 for securing in-tunnel notifications, according to an implementation. The method 200 can be implemented by a system, e.g., the system 100 shown in FIG. 1, for securing in-tunnel notifications. The example method 200 shown in FIG. 2 can be implemented using additional, fewer, or different operations, which can be performed in the order shown or in a different order.

The method 200 provides techniques for securing in-tunnel messages, especially notifications regarding sending messages, by determining information included in a packet. By identifying a tunneling control message in the packet based on address information, header extensions, or any suitable discriminators included in the packet, the endpoint receives an indication corresponding to the tunneling connection, e.g., a connection request has been blocked, a status of the server, and/or a further ownership request, to facilitate pushing the notification, such that the method 200 is able to send/receive a secured and efficient in-tunnel notification.

The method 200 starts at step 202 with establishing a tunneling connection between a server and an endpoint. In some cases, the endpoint may be a terminal, a desktop, a user equipment, and any suitable computer devices to send/receive notification from a third-party operating system. In some cases, the server may be a cloud server that manages the tunneling connection for security/access control.

At step 204, the endpoint receives a packet from the server over the tunneling connection.

At step 206, the endpoint determines that the packet comprises a tunneling control message based on at least one address, a header extension, or any suitable discriminator in the packet.

In some cases, the tunneling control message indicates that a connection request has been blocked by the server. In another scenario, the connection request may also have been blocked by another server in a network, e.g., a server on the internet or on the cloud.

In some cases, the tunneling control message indicates a server maintenance notification.

In some cases, the tunneling control message indicates an ownership request. Furthermore, in response to the ownership request, sending an ownership response.

In some cases, the address in the packet comprises IP and port information of a packet source and IP and port information of a packet destination. Furthermore, the endpoint determines that the IP and port information of the packet source and the IP and port information of the packet destination meet predetermined rules, in response to the determination that that the IP and port information of the packet source and the IP and port information of the packet destination meet predetermined rules, blocks the packet. In some cases, the address may be a source port number or a destination port number. In some cases, the address may be a source IP address or a destination IP address.

The steps 202 to 206 may be performed by a same operator. For example, the steps 202 to 206 may be performed by a same server (e.g., server shown in FIG. 1). In some cases, the steps 202 to 206 may be performed separately, by different operators. For example, the steps of determining that the packet comprises a tunneling control message based on at least one address in the packet may be performed/initiated by a terminal or an endpoint. More specifically, the steps 202 to 206 may be performed in different environments. For example, the determination of selecting a protocol may be accomplished in a third-party environment, e.g., a third-party server.

With reference to the description of FIGS. 1 through 2, the secured tunneling connection, as described herein, can provide the following technical effects. The described secured tunneling connection techniques can provide a stable and secure connection for data transmission. With pre-determinations and authentication associated with packets and tunneling connections, the push notification can be performed real-time. Furthermore, the transmission is done in such a reliable, efficient manner by a retransmission-and-ACK mechanism to reduce transmission space and message size, the connection may avoid a loss of IP packet in transmission because. Therefore, the computing performance of a system utilized the secured, established connection herein can be improved.

Figure 3:
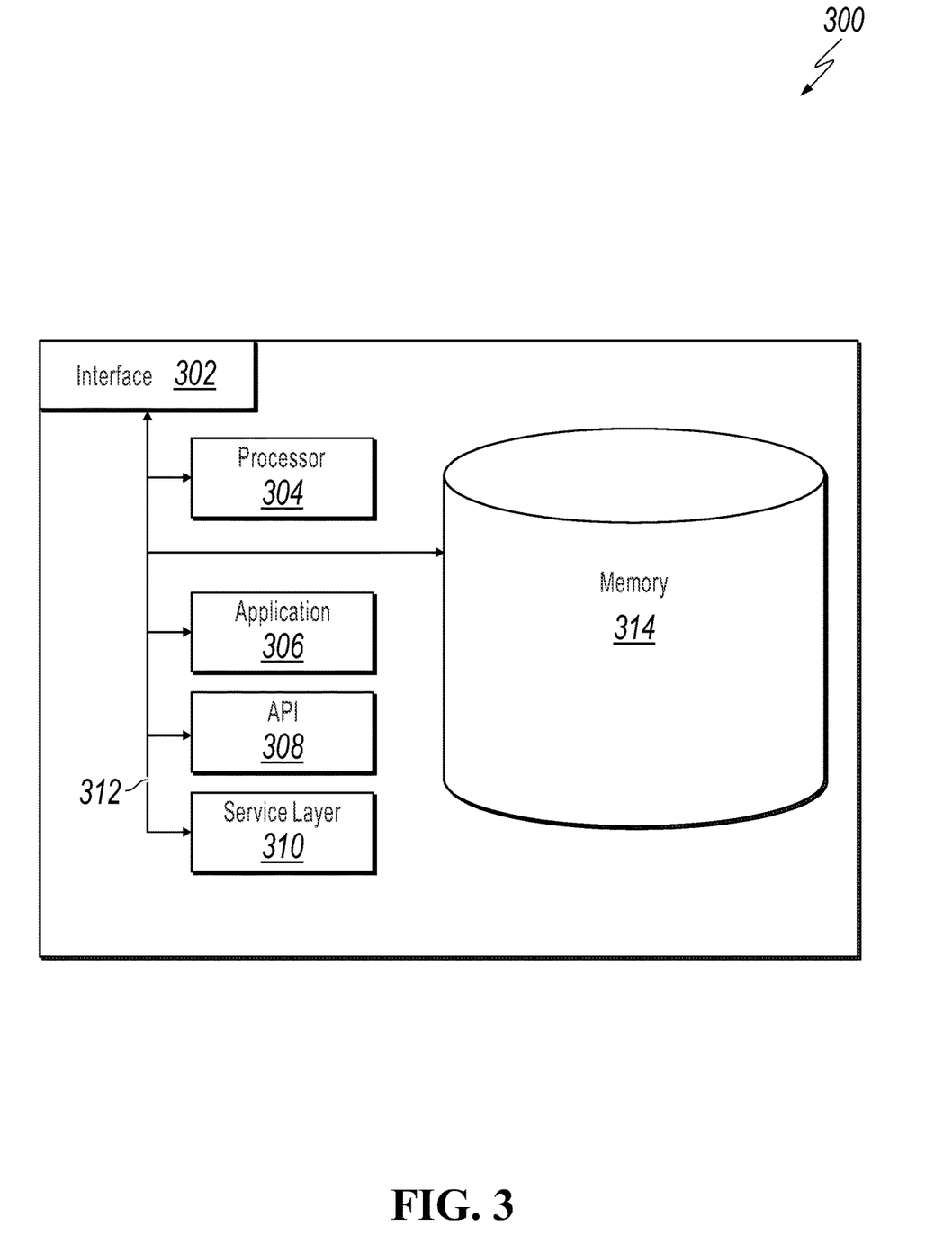
FIG. 3 illustrates a high level architecture block diagram of a server, according to an implementation.

FIG. 3 illustrates a high level architecture block diagram of a server 300 according to an implementation. The server 300 can be implemented as the servers described in FIGS. 1 and 2. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The server 300 includes a computing system configured to process a packet received over a tunneling connection to secure data transmission. In some cases, the server 300 may include a computing system implementing processes and methods disclosed in FIGS. 1 and 2. In some cases, the processing algorithm of the protocol selection can be implemented in an executable computing code, e.g., C/C++ executable codes. In some cases, the server 300 can include a standalone Linux system that runs batch applications. In some cases, the server 300 can include mobile or personal computers.

The server 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The server 300 can serve as a client, network component, a server, a database or other persistency, and/or any other components. In some implementations, one or more components of the server 300 may be configured to operate within a cloud-computing-based environment.

At a high level, the server 300 is an electronic computing device operable to receive, transmit, process, store, or manage data. According to some implementations, the server 300 can also include or be communicably coupled with an application server, e-mail server, web server, caching server, streaming data server, business intelligence (BI) server, and/or other servers.

The server 300 can process in-tunnel packets via a tunneling connection over the network from a client application and/or a third-party application. In addition, data/packet can be processed by the server 300 from internal users (e.g., from a command console or by another appropriate access method), external or third parties, other automated applications, as well as any other appropriate entities, individuals, systems, or computers.

Each of the components of the server 300 can communicate using a system bus 312. In some implementations, any and/or all the components of the server 300, both hardware and/or software, may interface with each other and/or the interface 302 over the system bus 312 using an application programming interface (API) 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the server 300. The functionality of the server 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the servers 300, alternative implementations may illustrate the API 308 and/or the service layer 310 as stand-alone components in relation to other components of the server 300. Moreover, any or all parts of the API 308 and/or the service layer 310 may be implemented as child or sub-modules of another software module, enterprise application, or hardware module without departing from the scope of this disclosure.

The server 300 includes an interface 302. Although illustrated as a single interface 302 in FIG. 3, two or more interfaces 302 may be used according to particular needs, desires, or particular implementations of the server 300. The interface 302 is used by the server 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the server 300.

The server 300 includes at least one processor 304. Although illustrated as a single processor 304 in FIG. 3, two or more processors may be used according to particular needs, desires, or particular implementations of the server. Generally, the processor 304 executes instructions and manipulates data to perform the operations of the server 300. Specifically, the processor 304 executes the functionality required for processing in-tunnel packets received via a tunneling connection disclosed in FIGS. 1 to 2.

The server 300 also includes a memory 314 that holds data for the server 300. Although illustrated as a single memory 314 in FIG. 3, two or more memories may be used according to particular needs, desires, or particular implementations of the server 300. While memory 314 is illustrated as an integral component of the server 300, in alternative implementations, memory 314 can be external to the server 300.

The application 306 is an algorithmic software engine providing functionality according to particular needs, desires, or particular implementations of the server 300, particularly with respect to the functionality required for anomaly detection. Although illustrated as a single application 306, the application 306 may be implemented as multiple applications 306 on the server 300. In addition, although illustrated as integral to the server 300, in alternative implementations, the application 306 can be external to the server 300.

There may be any number of the server 300 associated with, or external to, and communicating over a network. Further, this disclosure contemplates that many users may use one server 300, or that one user may use multiple servers 300.

Figure 4:
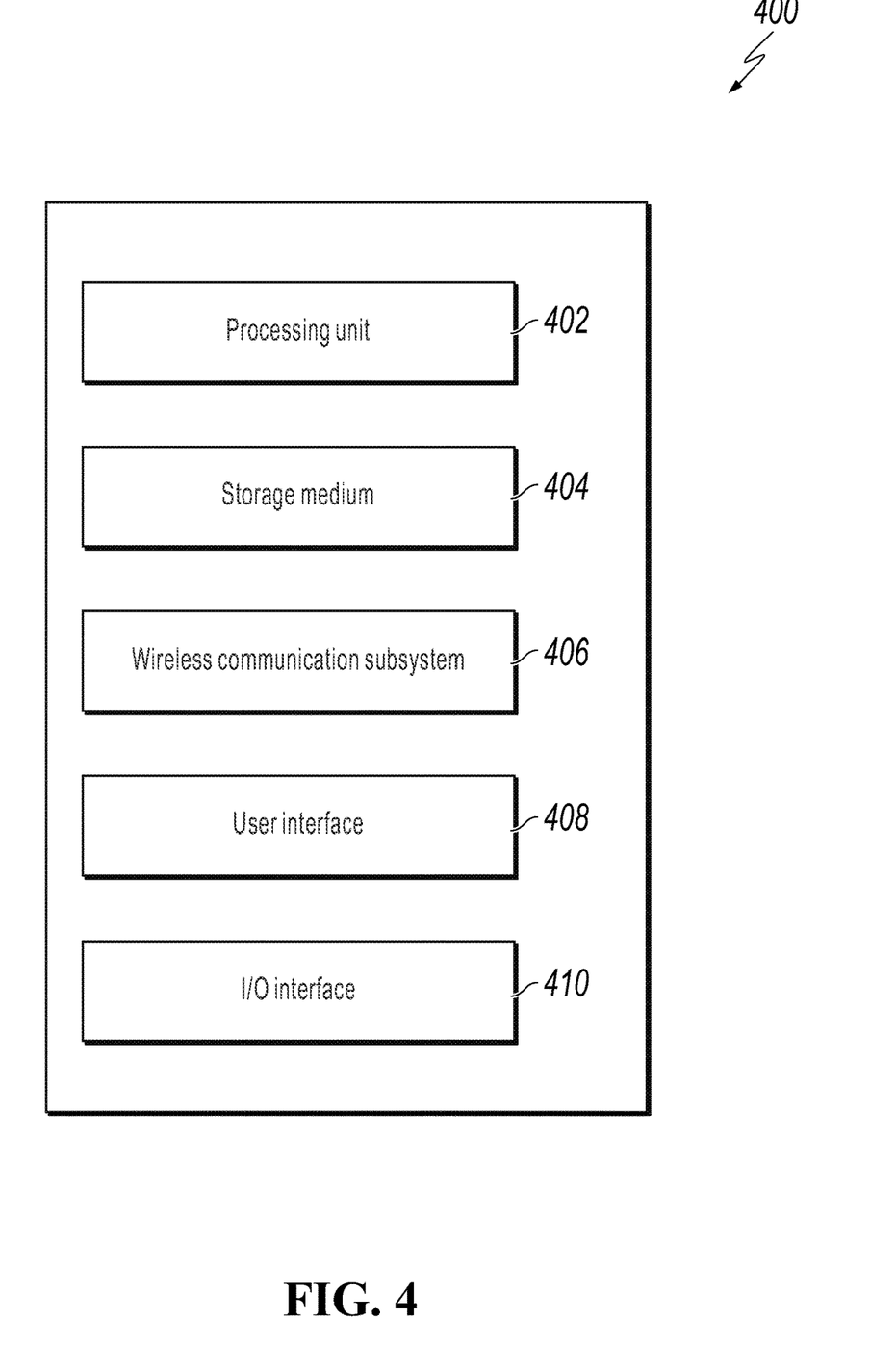
FIG. 4 is a block diagram illustrating an example user device, according to an implementation.

FIG. 4 is a block diagram illustrating an example user device 400 according to an implementation. The example user device 400 can be implemented as the endpoints described in FIGS. 1 and 2. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The illustrated device 400 includes a processing unit 402, a computer-readable storage medium 404 (for example, read-only memory (ROM) or flash memory), a wireless communication subsystem 406, a user interface 408, and an I/O interface 410.

The processing unit 402 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 402 may be configured to generate control information, such as a measurement report, or to respond to received information, such as control information from a network node. The processing unit 402 may also be configured to make a Radio Resource Management (RRM) decision such as cell selection/reselection information, or trigger a measurement report. The processing unit 402 can also include other auxiliary components, such as random access memory (RAM) and ROM.

The computer-readable storage medium 404 can store an operating system (OS) of the endpoint and various other computer-executable instructions, logic or software programs for performing one or more of the processes, steps, or actions described above. In some cases, the computer-readable storage medium 404 can be transitory, non-transitory, or a combination thereof.

The wireless communication subsystem 406 may be configured to provide wireless communication for voice, data, and/or control information provided by the processing unit 402. The wireless communication subsystem 406 can include, for example, one or more antennas, a receiver, a transmitter, a local oscillator, a mixer, and a DSP unit. In some implementations, the wireless communication subsystem 406 can support MIMO transmissions. In some implementations, the receiver in the wireless communication subsystems 406 can be an advanced receiver or a baseline receiver. Two receivers can be implemented with identical, similar, or different receiver processing algorithms.

The user interface 408 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 410 can include, for example, a universal serial bus (USB) interface.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

Described implementations of the subject matter can include one or more features, alone or in combination.

For example, in a first implementation, a method, comprising: establishing a tunneling connection between a server and an endpoint; receiving a packet from the server over the tunneling connection; and determining that the packet comprises a tunneling control message based on at least one address in the packet.

The foregoing and other described implementations can each, optionally, include one or more of the following features:

A first feature, combinable with any of the following features, wherein the tunneling control message indicates that a connection request has been blocked by the server.

A second feature, combinable with any of the foregoing and following features, wherein the tunneling control message indicates a server maintenance notification.

A third feature, combinable with any of the foregoing and following features, wherein the tunneling control message indicates an ownership request.

A fourth feature, combinable with any of the foregoing and following features, further comprising: in response to the ownership request, sending an ownership response.

A fifth feature, combinable with any of the foregoing and following features, wherein the at least one address in the packet comprises internet protocol (IP) and port information of a packet source and IP and port information of a packet destination.

A sixth feature, combinable with any of the foregoing and following features, determining that the IP and port information of the packet source and the IP and port information of the packet destination meet predetermined rules; and in response to the determination that the IP and port information of the packet source and the IP and port information of the packet destination meet the predetermined rules, blocking the packet.

In a second implementation, a computer-readable medium containing instructions which, when executed, cause a computing device to perform operations comprising: establishing a tunneling connection between a server and an endpoint; receiving a packet from the server over the tunneling connection; and determining that the packet comprises a tunneling control message based on at least one address in the packet.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: establishing a tunneling connection between a server and an endpoint; receiving a packet from the server over the tunneling connection; and determining that the packet comprises a tunneling control message based on at least one address in the packet.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM, RAM, or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or package into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   establishing a tunneling connection between a server and an endpoint;
   receiving a packet from the server over the tunneling connection, wherein an Internet Protocol (IP) address field of the packet is set to a particular value indicating that the packet is to be inspected by the endpoint;
   determining, by the endpoint, whether to inspect the packet based on whether the IP address field of the packet is set to the particular value; and
   determining, by the endpoint based on the IP address field of the packet, that the packet comprises a tunneling control message, wherein the tunneling control message indicates a tunneling event.

2. The computer-implemented method of claim 1, wherein the tunneling event comprises a connection request having been blocked by the server.

3. The computer-implemented method of claim 1, wherein the tunneling event comprises a server maintenance notification.

4. The computer-implemented method of claim 1, wherein the tunneling event comprises an ownership request.

5. The computer-implemented method of claim 4, further comprising:
   in response to the ownership request, sending an ownership response.

6. The computer-implemented method of claim 1, wherein the IP address field refers to the tunneling event.

7. A non-transitory computer-readable medium containing instructions which, when executed, cause a computing device to perform operations comprising:
   establishing a tunneling connection between a server and an endpoint;
   receiving a packet from the server over the tunneling connection, wherein an Internet Protocol (IP) address field of the packet is set to a particular value indicating that the packet is to be inspected by the endpoint;
   determining whether to inspect the packet based on whether the IP address field of the packet is set to the particular value; and
   determining, based on the IP address field of the packet, that the packet comprises a tunneling control message, wherein the tunneling control message indicates a tunneling event.

8. The computer-readable medium of claim 7, wherein the tunneling event comprises a connection request having been blocked by the server.

9. The computer-readable medium of claim 7, wherein the tunneling event comprises a server maintenance notification.

10. The computer-readable medium of claim 7, wherein the tunneling event comprises an ownership request.

11. The computer-readable medium of claim 10, wherein the operations further comprise:
    in response to the ownership request, sending an ownership response.

12. The non-transitory computer-readable medium of claim 7, wherein the IP address field refers to the tunneling event.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       establishing a tunneling connection between a server and an endpoint;
       receiving a packet from the server over the tunneling connection, wherein an Internet Protocol (IP) address field of the packet is set to a particular value indicating that the packet is to be inspected by the endpoint;
       determining, whether to inspect the packet based on whether the IP address field of the packet is set to the particular value; and
       determining, based on the IP address field of the packet, that the packet comprises a tunneling control message, wherein the tunneling control message indicates a tunneling event.

14. The computer-implemented system of claim 13, wherein the tunneling event comprises a connection request having been blocked by the server.

15. The computer-implemented system of claim 13, wherein the tunneling event comprises a server maintenance notification.

16. The computer-implemented system of claim 13, wherein the tunneling event comprises an ownership request.

17. The computer-implemented system of claim 16, wherein the one or more operations further comprise:
    in response to the ownership request, sending an ownership response.

18. The computer-implemented system of claim 13, wherein the IP address field refers to the tunneling event.

19. A computer-implemented method, comprising:
    establishing a tunneling connection between a server and an endpoint;
    receiving a request from the endpoint over the tunneling connection between the server and the endpoint;
    in response to receiving the request, determining a status of the request; and
    sending a packet to the endpoint over the tunneling connection, wherein the packet comprises a tunneling control message indicating the status of the request, and an Internet Protocol (IP) address field of the packet is set to a particular value indicating that the packet is to be inspected by the endpoint.

* * * * *